(12) United States Patent
Feng

(10) Patent No.: US 12,322,755 B2
(45) Date of Patent: Jun. 3, 2025

(54) ELECTROLYTE OF LITHIUM-ION SECONDARY BATTERY AND APPLICATION THEREOF

(71) Applicant: SVolt Energy Technology Co., Ltd., Changzhou (CN)

(72) Inventor: Shaowei Feng, Changzhou (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 476 days.

(21) Appl. No.: 17/782,599

(22) PCT Filed: Oct. 29, 2020

(86) PCT No.: PCT/CN2020/124715
§ 371 (c)(1),
(2) Date: Jun. 3, 2022

(87) PCT Pub. No.: WO2021/238052
PCT Pub. Date: Dec. 2, 2021

(65) Prior Publication Data
US 2023/0038758 A1   Feb. 9, 2023

(30) Foreign Application Priority Data
May 28, 2020   (CN) .......................... 202010467257.3

(51) Int. Cl.
| | |
|---|---|
| H01M 10/0567 | (2010.01) |
| H01M 4/38 | (2006.01) |
| H01M 4/485 | (2010.01) |
| H01M 4/505 | (2010.01) |
| H01M 4/525 | (2010.01) |
| H01M 4/583 | (2010.01) |
| H01M 10/0525 | (2010.01) |
| H01M 10/0568 | (2010.01) |
| H01M 10/0569 | (2010.01) |
| H01M 4/02 | (2006.01) |

(52) U.S. Cl.
CPC ....... *H01M 10/0567* (2013.01); *H01M 4/386* (2013.01); *H01M 4/485* (2013.01); *H01M 4/505* (2013.01); *H01M 4/525* (2013.01); *H01M 4/583* (2013.01); *H01M 10/0525* (2013.01); *H01M 10/0568* (2013.01); *H01M 10/0569* (2013.01); *H01M 2004/027* (2013.01); *H01M 2004/028* (2013.01); *H01M 2300/0028* (2013.01); *H01M 2300/0051* (2013.01)

(58) Field of Classification Search
None
See application file for complete search history.

(56) References Cited

U.S. PATENT DOCUMENTS

| | | | |
|---|---|---|---|
| 2015/0180087 A1 | 6/2015 | Kim et al. | |
| 2020/0161702 A1 | 5/2020 | Ma et al. | |

FOREIGN PATENT DOCUMENTS

| | | | |
|---|---|---|---|
| CN | 1333580 | A | 1/2002 |
| CN | 109361018 | A | 2/2019 |
| CN | 111106383 | A | 5/2020 |
| CN | 111430801 | A | 7/2020 |
| EP | 1 174 940 | | 1/2002 |
| JP | H11-3728 | A | 1/1999 |
| JP | 2000-351783 | A | 12/2000 |
| JP | 2001-185214 | A | 7/2001 |
| JP | 2003-132946 | A | 5/2003 |
| JP | 2005-222830 | A | 8/2005 |
| JP | 2008-004557 | A | 1/2008 |
| WO | WO 2016/209841 | A1 | 12/2016 |

OTHER PUBLICATIONS

Japanese Written Opinion date of submission Dec. 28, 2023, in connection with Japanese Application No. 2022-572790 with English translation thereof.
International Search Report dated Mar. 9, 2021, in connection with International Application No. PCT/CN2020/124715.
Notification to Grant Patent Right for Invention dated Mar. 14, 2022, in connection with Chinese Application No. 202010467257.3.
Notification to Grant Patent Rights for Invention dated Mar. 22, 2022, in connection with Chinese Application No. 202010467257.3, with English translation thereof.
CN 202010467257.3, Mar. 22, 2022, Chinese Notification to Grant Patent Right for Invention.
EP 20937349.7, Aug. 27, 2024, Extended European Search Report.
Extended European Search Report dated Aug. 27, 2024, in connection with European Application No. EP 20937349.7.

*Primary Examiner* — Carlos Barcena
(74) *Attorney, Agent, or Firm* — Wolf, Greenfield & Sacks, P.C.

(57) ABSTRACT

An electrolyte of a lithium-ion secondary battery and an application thereof. The electrolyte of the lithium-ion secondary battery includes an organic solution, a lithium salt, and an additive, and the additive comprises a borate compound. The electrolyte can be better applied to low-cobalt or cobalt-free positive electrode materials, improve the high-temperature cycle and storage performance of the lithium-ion batteries, and inhibit gas generation during high-temperature storage, thereby improving the comprehensive performance of the battery.

8 Claims, No Drawings

ELECTROLYTE OF LITHIUM-ION SECONDARY BATTERY AND APPLICATION THEREOF

CROSS-REFERENCES TO RELATED APPLICATIONS

This is a National Stage Application, filed under 35 U.S.C. 371, of International Patent Application No. PCT/CN2020/124715, filed on Oct. 29, 2020, which is based on and claims priority to Chinese Patent Application No. 202010467257.3 filed with the China National Intellectual Property Administration (CNIPA) on May 28, 2020, the disclosure of which is incorporated herein by reference in its entirety.

TECHNICAL FIELD

The present disclosure relates to the field of batteries, for example, to an electrolyte for a lithium-ion secondary battery and application thereof.

BACKGROUND

In recent years, the industry of lithium-ion batteries used in automobiles has developed vigorously. In order to meet the requirements for electric vehicles, such as long operation time, long cruising range, normal working in high-temperature and low-temperature environment, fast charging, and long service life, it is necessary to develop lithium-ion secondary batteries with higher energy density, and better high-temperature cycle, storage performance and low-temperature rate capability. Besides, the electrochemical stability of the electrolyte has remarkable effect on the high-temperature cycle, storage, and low-temperature charge-discharge properties of lithium-ion secondary batteries. Therefore, the formation of high-temperature stable and cycle stable SEI films on anode and cathode by improving the composition of the electrolyte is of great significance for improvement of the comprehensive behavior of batteries at high temperature and low temperature.

SUMMARY

In the existing art, most of the anodes used in lithium-ion power batteries are ternary cathode materials ($LiNi_xCo_yMn_zO_2$ and $LiNi_xCo_{1-x}O_2$) with high nickel content. In recent years, due to global scarcity of cobalt metal resources, cobalt-free cathode materials ($LiNi_xMn_{1-x}O_2$) have become a research hotspot. However, such cathode materials, without cobalt metal, is unstable in structure at high temperature, and is prone to the irreversible phase transition, oxygen release and thus generation of non-conducting NiOx compounds on the surface. Moreover, in the cycle process, Ni and Mn metal ions tend to dissolve out and be reduced on the cathode surface, resulting in improved impedance. In addition, the high valent $Ni^{4+}$ in the anode tends to react with the electrolyte via catalytic oxidation, which leads to gas production and reduced cycle life.

The present disclosure provides an electrolyte for a lithium-ion secondary battery, which can improve the high-temperature cycle and storage performances of the lithium-ion battery, inhibit gas production during high-temperature storage, and improve the comprehensive behavior of the battery; and application thereof.

The present disclosure provides an electrolyte for a lithium-ion secondary battery in an embodiment. The electrolyte includes an organic solvent, a lithium salt, and an additive, the additive including a borate compound having a structure represented by Formula I, where the value of n is 0, 1, 2, 3 or 4.

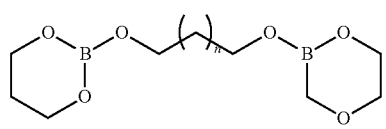

Formula I

In an embodiment, the borate compound is included in an amount of 0.01 wt % to 5 wt %, such as 0.01 wt %, 0.1 wt %, 0.5 wt %, 1 wt %, 2 wt %, 3 wt %, 4 wt %, 5 wt %, etc. of the total mass of the electrolyte.

In an embodiment, the structure represented by Formula I contains a halogen substituent on a carbon atom.

In an embodiment, the borate compound includes

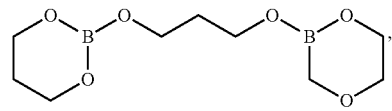 [SMILES: C(COB1COCCO1)COB1OCCCO1]

i.e., trimethylene borate.

In an embodiment, the additive includes vinylene carbonate, and said vinylene carbonate may be included in an amount of 0.1 wt % to 3 wt %, such as 0.1 wt %, 0.5 wt %, 1 wt %, 1.4 wt %, 1.8 wt %, 2.2 wt %, 2.6 wt %, 3 wt %, etc. of the total mass of the electrolyte.

In an embodiment, the organic solvent includes a sulfone compound having a structure represented by Formula II, where the value of n is 0, 1, 2, 3 or 4.

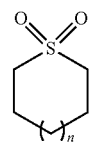

Formula II

In an embodiment, the sulfone compound is included in an amount of 1 wt % to 20 wt %, such as 1 wt %, 3 wt %, 5 wt %, 10 wt %, 12 wt %, 14 wt %, 16 wt %, 18 wt %, 20 wt %, etc. of the total mass of the organic solvent.

In an embodiment, the sulfone compound includes at least one of

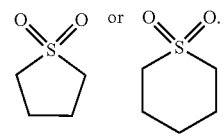

In an embodiment, the organic solvent includes a cyclic carbonate and/or a chain carbonate. The cyclic carbonate is at least one selected from vinyl carbonate, propylene carbonate and gamma-butyrolactone. The chain carbonate is at least one selected from dimethyl carbonate, butylene carbonate, diethyl carbonate, dipropyl carbonate, methyl ethyl carbonate, methyl propyl carbonate, ethyl propyl carbonate, methyl formate, ethyl formate, propyl formate, methyl acetate, ethyl acetate, propyl acetate, methyl propionate, ethyl propionate and propyl propionate.

In an embodiment, the lithium salt is at least one selected from $LiPF_6$, $LiBF_4$, LiBOB, LiDFOB, $LiAsF_6$, $Li(CF_3SO_2)_2N$, $Li(FSO_2)_2N$, $LiPO_2F_2$, $LiCF_3SO_3$ and $LiClO_4$.

The present disclosure provides a lithium-ion secondary battery having the aforementioned electrolyte for a lithium-ion secondary battery in an embodiment.

In an embodiment, a cathode active material used in the lithium-ion secondary battery is at least one selected from $LiCoO_2$, $LiMn_2O_4$, $LiMnO_2$, $Li_2MnO_4$, $LiFePO_4$, $LiNi_xMn_{1-x}O_2$, $LiNi_xCo_yMn_zO_2$, $Li_{1+a}Mn_{1-x}M_xO_2$, $LiCo_{1-x}M_xO_2$, $LiFe_{1-x}M_xPO_4$, $LiMn_{2-y}M_yO_4$ and $Li_2Mn_{1-x}O_4$, where M is at least one selected from Ni, Co, Mn, Al, Cr, Mg, Zr, Mo, V, Ti, B, F and Y, the value of a is ranged from 0 to 0.2, the value of x is ranged from 0 to 1, the value of y is ranged from 0 to 1, and the value of z is ranged from 0 to 1.

In an embodiment, the cathode active material used in the lithium-ion secondary battery is a low-cobalt or cobalt-free cathode material.

The cobalt-free cathode material in the present disclosure can relieve the limitation of the existing scarce metal cobalt source on the cathode material while ensuring that the cathode material has excellent rate capability, cycle stability, and other comprehensive behavior.

In an embodiment, the anode active material used in the lithium-ion secondary battery is at least one selected from natural graphite, artificial graphite, soft carbon, hard carbon, lithium titanate, silicon, silicon-carbon alloy and silicon-oxygen alloy.

The anode active material in the present disclosure is capable of lithium-ion intercalation and deintercalation reaction, which can further ensure the electrochemical performance and cycle performance of the lithium-ion secondary battery.

The present disclosure provides a lithium-ion secondary battery in an embodiment. The lithium-ion secondary battery includes a anode plate, a cathode plate, a separator, the aforementioned electrolyte for a lithium-ion secondary battery, and a package, wherein the anode plate includes an anode current collector and an anode sheet containing an anode active material and disposed on the anode current collector, the cathode plate includes a cathode current collector and a cathode sheet containing a cathode active material and disposed on the cathode current collector, the separator is disposed between the anode plate and the cathode plate, and the package may be an aluminum-plastic film, a stainless steel cylinder, a square aluminum shell, etc.

The present disclosure provides an energy storage device in an embodiment. The energy storage device includes the aforementioned lithium-ion secondary battery or the aforementioned electrolyte for a lithium-ion secondary battery.

DETAILED DESCRIPTION

The present disclosure provides an electrolyte for a lithium-ion secondary battery in an embodiment. The electrolyte includes an organic solvent, a lithium salt, and an additive, the additive including a borate compound having a structure represented by Formula I, where the value of n is 0, 1, 2, 3 or 4.

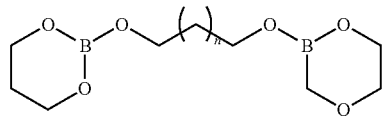

Formula I

The electrolyte in the present disclosure can better accommodate low-cobalt or cobalt-free cathode materials for the following reasons: The cobalt-free cathode materials, without cobalt metal, is unstable at high temperature, and is prone to irreversible phase transition, oxygen release, and thus generation of non-conductive NiOx compounds on the surface; Moreover, in the cycle process, Ni and Mn metal ions tend to dissolve out and be reduced on the cathode surface, resulting in improved impedance; In addition, the high valent $Ni^{4+}$ in the anode tends to react with the electrolyte via catalytic oxidation, which leads to gas production and reduced cycle life.

The electrolyte of the present disclosure can form stable SEI films in the charge-discharge process, which can effectively inhibit the reaction of the electrolyte on the surface of the electrode material, prevent the cathode material metal from dissolving out, improve the high-temperature cycle and storage performances of the lithium-ion battery, and inhibit gas production during high-temperature storage, thereby improving the comprehensive behavior of the battery.

In an embodiment, the borate compound is included in an amount of 0.01 wt % to 5 wt %, such as 0.01 wt %, 0.1 wt %, 0.5 wt %, 1 wt %, 2 wt %, 3 wt %, 4 wt %, 5 wt %, etc. of the total mass of the electrolyte. Too low amount of the borate compounds has neither significant effect on reducing the catalytic activity of the cathode metal, nor benefit for the formation of stable SEI films on the surface of the cathode material, which cannot effectively solve the problems of the cathode material, such as unstable structure at high temperature, dissolving out of metal, and gas production. Too high amount of the borate compound not only leads to too high viscosity of the electrolyte, which affects the electrochemical performance of the battery, but also leads to reduced conductivity of the electrolyte at low temperature, which causes the decline of the low-temperature performance of the battery. In the present disclosure, the borate compound is limited to the amount specified herein, which allows to effectively inhibit the reaction of the electrolyte on the surface of the electrode material, prevent the cathode material metal from dissolving out, improve the high-temperature cycle and storage performance of the lithium-ion battery, and inhibit gas production during high-temperature storage without reducing the electrochemical performance, thereby significantly improving the comprehensive behavior of the battery.

In an embodiment, the structure represented by Formula I contains a halogen substituent on a carbon atom.

In an embodiment, the borate compound includes

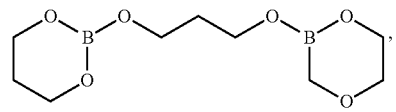 [SMILES: C(COB1COCCO1)COB1OCCCO1]

i.e., trimethylene borate.

The trimethylene borate of the present disclosure has a low molecular weight. Therefore, when the trimethylene borate is used as an additive in the electrolyte, there may be a complexation reaction between the trimethylene borate and electron-rich cathode metal elements Ni and Mn, which reduces the catalytic reaction activity of the cathode metal, and the trimethylene borate is oxidized on the surface of the cathode material to form stable SEI films, which can also reduce the cathode influence of the borate compound on the electrolyte viscosity, thereby further improving the electrochemical performance and cycle performance of the lithium-ion secondary battery, reducing the gas production rate of the battery at high temperature, and endowing the lithium battery with great comprehensive behavior at high temperature and low temperature.

In an embodiment, the additive includes vinylene carbonate, and said vinylene carbonate may be included in an amount of 0.1 wt % to 3 wt %, such as 0.1 wt %, 0.5 wt %, 1 wt %, 1.4 wt %, 1.8 wt %, 2.2 wt %, 2.6 wt %, 3 wt %, etc. of the total mass of the electrolyte.

According to the present disclosure, the combination of vinylene carbonate and the borate compound used in electrolyte and vinyl carbonate limited to the preceding amount can better improve the high-and-low temperature performance and gas production of the lithium-ion secondary battery and significantly improve the cycle performance and storage performance of the battery at high temperature.

In an embodiment, the vinylene carbonate may be included in an amount of 0.5 wt % to 1 wt % of the total mass of the electrolyte, thereby further improving the high-and-low temperature performance and gas production of the lithium-ion secondary battery and improving the comprehensive behavior of the lithium-ion secondary battery at normal temperature and high temperature.

In an embodiment, the organic solvent includes a sulfone compound having a structure represented by Formula II, where the value of n is 0, 1, 2, 3 or 4.

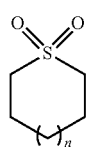

Formula II

The cyclic sulfone solvent represented by Formula II of the present disclosure has higher oxidation resistance than the carbonate solvent and thus is less likely to be oxidized by the high valent metal $Ni^{4+}$ on the surface of the anode, thereby significantly improving the oxidation resistance of the electrolyte, effectively improving the high-temperature performance of the battery, and reducing the gas production. Especially, the use of the sulfone compound, the borate compound and/or vinylene carbonate in combination can additionally generate an synergistic effect.

In an embodiment, the sulfone compound is included in an amount of 1 wt % to 20 wt %, such as 1 wt %, 3 wt %, 5 wt %, 10 wt %, 12 wt %, 14 wt %, 16 wt %, 18 wt %, 20 wt %, etc. of the total mass of the organic solvent.

In the present disclosure, if the amount of the sulfone compound is too low, the oxidation resistance of the electrolyte cannot be significantly improved. If the amount of the sulfone compound is too high, the sulfone compound cannot be completely dissolved in the electrolyte, which causes mutual delamination of the sulfone compound and the electrolyte. In the present disclosure, the sulfone compound is limited to the amount specified herein, which can not only significantly improve the oxidation resistance of the electrolyte, effectively improve the high-temperature performance of the battery, and reduce the gas production, but also increase the dielectric constant of the electrolyte and improve the ionic conductivity of the electrolyte.

In an embodiment, the sulfone compound includes at least one of

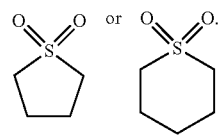

Sulfolane and cyclopentyl sulfone according to the present disclosure have smaller molecular weight and lower viscosity than other cyclic sulfones, and when they are used as a solvent in the electrolyte, it can be ensured that the electrolyte has low viscosity and high conductivity, and the electrochemical performance, high-temperature performance, and gas production at high temperature in addition to the oxidation resistance of electrolyte can be improved.

In an embodiment, the organic solvent includes a cyclic carbonate and/or a chain carbonate. The cyclic carbonate is at least one selected from vinyl carbonate, propylene carbonate and gamma-butyrolactone. The chain carbonate is at least one selected from dimethyl carbonate, butylene carbonate, diethyl carbonate, dipropyl carbonate, methyl ethyl carbonate, methyl propyl carbonate, ethyl propyl carbonate, methyl formate, ethyl formate, propyl formate, methyl acetate, ethyl acetate, propyl acetate, methyl propionate, ethyl propionate and propyl propionate.

In an embodiment, the lithium salt is at least one selected from $LiPF_6$, $LiBF_4$, LiBOB, LiDFOB, $LiAsF_6$, $Li(CF_3SO_2)_2N$, $Li(FSO_2)_2N$, $LiPO_2F_2$, $LiCF_3SO_3$ and $LiClO_4$.

The electrolyte for a lithium-ion secondary battery in the present disclosure has at least the following advantages. The borate compound used herein contains boron atoms and is a Lewis acid with an electron-deficient structure, which, on the one hand, can have the complexation reaction with electron-rich cathode metal elements Ni and Mn, thereby reducing the catalytic reaction activity of the cathode metal, and on the other hand, can be oxidized on the surface of the cathode material to form stable SEI films in the charge-discharge process, thereby effectively inhibiting the reaction of the electrolyte on the surface of the electrode material, preventing the cathode material metal from dissolving out, improving the high-temperature cycle and storage performance of the lithium-ion battery, inhibiting gas production during high-temperature storage, and improving the comprehensive behavior of the battery. Compared with the existing electrolyte, the electrolyte can be applied to the low-cobalt or cobalt-free cathode material so that the lithium-ion secondary battery with the electrolyte has better cycle stability, higher capacity retention rate and lower gas production rate after storage at high temperature, and better comprehensive behavior at high temperature and low temperature.

The present disclosure provides a lithium-ion secondary battery having the aforementioned electrolyte for a lithium-ion secondary battery in an embodiment.

In an embodiment, a cathode active material used in the lithium-ion secondary battery is at least one selected from $LiCoO_2$, $LiMn_2O_4$, $LiMnO_2$, $Li_2MnO_4$, $LiFePO_4$, $LiNi_xMn_{1-x}O_2$, $LiNi_xCo_yMn_zO_2$, $Li_{1+a}Mn_{1-x}M_xO_2$, $LiCo_{1-x}M_xO_2$, $LiFe_{1-x}M_xPO_4$, $LiMn_{2-y}M_yO_4$ and $Li_2Mn_{1-x}O_4$, where M is at least one selected from Ni, Co, Mn, Al, Cr, Mg, Zr, Mo, V, Ti, B, F and Y, the value of a is ranged from 0 to 0.2, the value of x is ranged from 0 to 1, the value of y is ranged from 0 to 1, and the value of z is ranged from 0 to 1.

In an embodiment, the cathode active material used in the lithium-ion secondary battery is a low-cobalt or cobalt-free cathode material.

The cobalt-free cathode material in the present disclosure can relieve the limitation of the existing scarce metal cobalt source on the cathode material while ensuring that the cathode material has excellent rate capability, cycle stability, and other comprehensive behavior.

In an embodiment, the anode active material used in the lithium-ion secondary battery is at least one selected from natural graphite, artificial graphite, soft carbon, hard carbon, lithium titanate, silicon, silicon-carbon alloy and silicon-oxygen alloy.

The anode active material in the present disclosure is capable of lithium-ion intercalation and deintercalation reaction, which can further ensure the electrochemical performance and cycle performance of the lithium-ion secondary battery.

The present disclosure provides a lithium-ion secondary battery in an embodiment. The lithium-ion secondary battery includes an anode plate, a cathode plate, a separator, the aforementioned electrolyte for a lithium-ion secondary battery, and a package, wherein the anode plate includes an anode current collector and an anode sheet containing an anode active material and disposed on the anode current collector, the cathode plate includes a cathode current collector and a cathode sheet containing a cathode active material and disposed on the cathode current collector, the separator is disposed between the anode plate and the cathode plate, and the package may be an aluminum-plastic film, a stainless steel cylinder, a square aluminum shell, etc.

The lithium-ion secondary battery in the present disclosure has the following advantages: good cycle stability, high capacity retention rate and low gas production rate after storage at high temperature, low cell expansion rate, and excellent comprehensive behavior at high temperature and low temperature.

The present disclosure provides an energy storage device in an embodiment. The energy storage device includes the aforementioned lithium-ion secondary battery or the aforementioned electrolyte for a lithium-ion secondary battery.

Compared with the related art, the energy storage device in the present disclosure has better cycle stability, lower cell expansion rate after storage at high temperature, higher safety, and prolonged service life.

Example 1

This example provides a lithium-ion secondary battery. The specific preparation method includes the following steps.

(1) Preparation of an Anode Plate of the Lithium-Ion Secondary Battery

An anode active material lithium nickel manganate ($LiNi_{0.75}Mn_{0.25}O_2$), a conductive agent Super-P (superconductive carbon black), and an adhesive polyvinylidene fluoride (PVDF) were dissolved in a solvent N-methylpyrrolidone (NMP) at a mass ratio of 96:2.0:2.0 and mixed uniformly to prepare an anode paste. Then, the anode paste was coated uniformly on a current collector being an aluminum foil in an amount of 18 mg/cm². The coated aluminum foil was oven dried at 85° C., subjected to cold pressing, edge trimming, cutting, and stripping, and then dried in vacuum at 85° C. for 4 hours. A battery tab was welded to manufacture the anode plate of the lithium-ion secondary battery as desired.

(2) Preparation of a Cathode Plate of the Lithium-Ion Secondary Battery

A cathode active material artificial graphite, a conductive agent Super-P, a thickener carboxymethyl cellulose (CMC), and an adhesive styrene-butadiene rubber (SBR) were dissolved in a solvent deionized water at a mass ratio of 96.5:1.0:1.0:1.5 and mixed uniformly to prepare a cathode paste. Then, the cathode paste was coated uniformly on a current collector being an aluminum foil in an amount of 8.9 mg/cm². The coated aluminum foil was oven dried at 85° C., subjected to cold pressing, edge trimming, cutting, and stripping, and dried in vacuum at 110° C. for 4 hours. A battery tab was welded to manufacture the cathode plate of the lithium-ion secondary battery as desired.

(3) Preparation of an Electrolyte of the Lithium-Ion Secondary Battery

The electrolyte of the lithium-ion secondary battery was prepared from 1 mol/L $LiPF_6$ as a lithium salt and the mixture of vinyl carbonate (EC), methyl ethyl carbonate (EMC), and diethyl carbonate (DEC) as a non-aqueous organic solvent, where the volume ratio of EC:EMC:DEC was 30:50:20. In addition, the electrolyte of the lithium-ion secondary battery further contained an additive, wherein the additive was trimethyl borate accounting for 0.5% of the total mass of the electrolyte of the lithium-ion secondary battery, i.e., the compound having the structure represented by Formula I where n is 1.

(4) Preparation of the Lithium-Ion Secondary Battery

The anode plate and the cathode plate of the lithium-ion secondary battery that were prepared by the preceding processes and a separator (PE film) were manufactured into a cell with a thickness of 8 mm, a width of 60 mm, and a length of 130 mm by the winding process. The cell was oven dried in vacuum at 75° C. for 10 hours, filled with the electrolyte, and rested for 24 hours. Then, the cell was charged to 4.2 V at a constant current of 0.1 C (160 mA), charged at a constant voltage of 4.2 V until the current dropped to 0.05 C (80 mA), and then discharged to 2.8V at a constant current of 0.1 C (160 mA). The preceding charge-discharge process was repeated twice. Finally, the cell was charged to 3.8 V at a constant current of 0.1 C (160 mA). Thus the preparation of the lithium-ion secondary battery was completed.

Example 2

Example 2 was the same with Example 1 except that the additive in the electrolyte in step (3) was trimethyl borate accounting for 1% of the total mass of the electrolyte of the lithium-ion secondary battery.

Example 3

Example 3 was the same with Example 1 except that the additive in the electrolyte in step (3) was consisting of trimethyl borate accounting for 0.5% of the total mass of the electrolyte of the lithium-ion secondary battery and vinylene carbonate (VC) accounting for 0.5% of the total mass of the electrolyte of the lithium-ion secondary battery.

Example 4

Example 4 was the same with Example 1 except that the organic solvent in step (3) in the electrolyte additionally included sulfolane (SL) accounting for 5% of the total mass of the organic solvent, that is, the composition of the organic solvent were EC, EMC, DEC, and SL, which were in a volume ratio of 30:50:15:5.

Example 5

Example 5 was the same with Example 1 except that the organic solvent in the electrolyte in step (3) additionally included sulfolane (SL) accounting for 10% of the total mass of the organic solvent, that is, the composition of the organic solvent were EC, EMC, DEC, and SL, which were in a volume ratio of 30:50:10:10.

Example 6

Example 6 was the same with Example 1 except that the organic solvent in the electrolyte in step (3) additionally included sulfolane (SL) accounting for 10% of the total mass of the organic solvent, that is, the composition of the organic solvent were EC, EMC, DEC, and SL, which were in a volume ratio of 30:50:10:10; and that the additive in the electrolyte was consisting of trimethyl borate accounting for 0.5% of the total mass of the electrolyte of the lithium-ion secondary battery and vinylene carbonate (VC) accounting for 0.5% of the total mass of the electrolyte of the lithium-ion secondary battery.

Comparative Example 1

Comparative Example 1 was the same with Example 1 except that no additive or sulfone solvent was added to the electrolyte in step (3).

The lithium-ion secondary batteries and electrolytes prepared according to Examples 1 to 6 and Comparative Example 1 were evaluated.

1. Evaluation of High-Temperature Cycle Performance for Lithium-Ion Secondary Batteries The test method is as follows. At 60° C., the lithium-ion secondary battery was charged to 4.2 V at a constant current of 1 C, charged at a constant voltage of 4.2 V to a current of 0.05 C, and then discharged to 2.8 V at a constant current of 0.1 C. The preceding process was a charge-discharge cycle process, and the discharge capacity at this cycle was considered as the discharge capacity at the first cycle. The cyclic charge-discharge test was performed on the lithium-ion secondary battery according to the preceding method, and the discharge capacity at the 500th cycle was measured.

Capacity retention rate (%) of the lithium-ion secondary battery after 500 cycles=[discharge capacity of the 500th cycle/discharge capacity of the first cycle]×100%. The test results are shown in Table 1.

2. Evaluation of High-Temperature Storage Performance for Lithium-Ion Secondary Batteries The test method is as follows. At 25° C., the lithium-ion secondary battery was charged to 4.2 V at a constant current of 1 C, charged at a constant voltage of 4.2 V to a current of 0.05 C, and then discharged to 2.8 V at a constant current of 1 C. The discharge capacity in this discharge process was the discharge capacity of the lithium-ion secondary battery before high-temperature storage. Then, the lithium-ion secondary battery was charged to 4.2 V at a constant current of 1 C and stored at 60° C. for 30 days. After the storage, the lithium-ion secondary battery was placed at 25° C., discharged to 2.8 V at a constant current of 0.5 C, charged to 4.2 V at a constant current of 1 C, charged at a constant voltage of 4.2 V to a current of 1 C, and then discharged to 2.8 V at a constant current of 1 C. The discharge capacity at the last cycle was considered as the discharge capacity of the lithium-ion secondary battery after high-temperature storage.

Capacity retention rate (%) of the lithium-ion secondary battery after high-temperature storage=[discharge capacity of the lithium-ion secondary battery after high-temperature storage/discharge capacity of the lithium-ion secondary battery before high-temperature storage]×100%. The test results are shown in Table 1.

3. Evaluation of High-Temperature Storage Gas Production Performance for Lithium-Ion Secondary Batteries The test method is as follows. At 25° C., the lithium-ion secondary battery was charged to 4.2 V at a constant current of 1 C, charged at a constant voltage of 4.2 V to a current of 0.05 C, and then discharged to 2.8 V at a constant current of 0.1 C. The discharge capacity in this cycle was considered as the discharge capacity of the lithium-ion secondary battery before high-temperature storage. Then, the lithium-ion secondary battery was charged to 4.2 V at a constant current of 1 C and then charged at a constant voltage of 4.2 V to a current of 0.05 C, and then the lithium-ion secondary battery was fully charged. The volume of the cell was measured by drainage, and the thickness of the cell was measured by a micrometer.

Then, the lithium-ion battery was stored at 60° C. for 30 days. After the storage, the lithium-ion secondary battery was placed at 25° C. The volume of the cell was measured by drainage, and the thickness of the cell was measured by a micrometer. The lithium-ion secondary battery was discharged to 2.8 V at a constant current of 0.5 C, charged to 4.2 V at a constant current of 1 C, charged at a constant voltage of 4.2 V to a current of 1 C, and then discharged to 2.8 V at a constant current of 1 C. The discharge capacity in the last cycle was considered as the discharge capacity of the lithium-ion secondary battery after high-temperature storage.

Cell volume expansion rate=(volume after storage/volume before storage−1)×100%. The test results are shown in Table 1.

TABLE 1

| | Solvent volume ratio | Type and proportion of the additive in the electrolyte | Cycling capacity retention rate | Storage capacity retention rate | Gas production rate after storage at 60° C. for 30 days |
|---|---|---|---|---|---|
| Example 1 | EC:EMC:DEC = 30:50:20 | 0.5 wt % trimethyl borate | 86% | 85% | 24% |
| Example 2 | EC:EMC:DEC = 30:50:20 | 1.0 wt % trimethyl borate | 88% | 88% | 22% |
| Example 3 | EC:EMC:DEC = 30:50:20 | 0.5 wt % trimethyl borate and 1 wt % VC | 90% | 89% | 23% |

TABLE 1-continued

| | Solvent volume ratio | Type and proportion of the additive in the electrolyte | Cycling capacity retention rate | Storage capacity retention rate | Gas production rate after storage at 60° C. for 30 days |
|---|---|---|---|---|---|
| Example 4 | EC:EMC:DEC:SL = 30:50:15:5 | 0.5 wt % trimethyl borate | 88% | 87% | 22% |
| Example 5 | EC:EMC:DEC:SL = 30:50:10:10 | 0.5 wt % trimethyl borate | 90% | 89% | 20% |
| Example 6 | EC:EMC:DEC:SL = 30:50:10:10 | 0.5 wt % trimethyl borate and 1 wt % VC | 92% | 91% | 19% |
| Comparative Example 1 | EC:EMC:DEC = 30:50:20 | No additive | 78% | 79% | 34% |

It can be seen from Table 1 that with the comparison between Examples 1 to 2 and Comparative Example 1, compared with the battery without any additives, with the addition of trimethyl borate, the capacity retention rate of the lithium-ion secondary battery after storage at 60° C. for 30 days increased, the capacity retention rate after cycle at 60° C. also increased, and the gas production rate decreased after high-temperature storage, which indicated that the borate compound could inhibit the side reaction between the electrolyte and the cathode material at high temperature and improve the capacity retention rate of the battery after high-temperature cycle and storage.

It can be seen from Example 3 that when the additive trimethyl borate was used in combination with the additive VC (vinylene carbonate), the cycle performance and the storage performance of the battery were improved more significantly.

It can be seen from Examples 4 to 6 that when the sulfone solvent sulfolane (SL) was added to the solvent, the cycle life of the battery was improved and the gas production was reduced, which indicates that sulfolane improves the oxidation resistance of the electrolyte and reduces the side reaction at the anode interface.

It can be seen from Examples 1 to 6 that trimethyl borate, vinylene carbonate and sulfolane added to the electrolyte together had a synergistic effect on the improvement of cycle life, high-temperature storage capacity retention rate, and gas production of the battery.

In conclusion, a lithium-ion secondary battery having the electrolyte composition according to the embodiments set forth in the present disclosure turns out to have improved cycle stability and high-temperature storage stability at normal temperature and high temperature.

What is claimed is:

1. A lithium-ion secondary battery, wherein a cathode active material used therein is LiNi$_x$Mn$_{1-x}$O$_2$, and the value of x is ranged from 0 to 1; an electrolyte used therein comprises an organic solvent, a lithium salt, and an additive, the additive comprises vinylene carbonate and a borate compound having a structure represented by Formula I

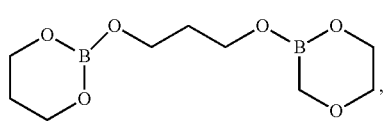

(Formula I)

and the organic solvent comprises a sulfone compound of

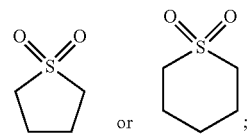 [SMILES: O=S1(=O)CCCC1 ; O=S1(=O)CCCCC1]

or ;

wherein the borate compound is included in an amount of 0.5 wt % to 1 wt % of the total mass of the electrolyte, the vinylene carbonate is included in an amount of 0.5 wt % to 1 wt % of the total mass of the electrolyte, and the sulfone compound is included in an amount of 5 wt % to 10 wt % of the total mass of the organic solvent.

2. The lithium-ion secondary battery according to claim 1, wherein the organic solvent comprises a cyclic carbonate and/or a chain carbonate, the cyclic carbonate is selected from at least one of vinyl carbonate, propylene carbonate and gamma-butyrolactone, and the chain carbonate is at least one selected from dimethyl carbonate, butylene carbonate, diethyl carbonate, dipropyl carbonate, methyl ethyl carbonate, methyl propyl carbonate, ethyl propyl carbonate, methyl formate, ethyl formate, propyl formate, methyl acetate, ethyl acetate, propyl acetate, methyl propionate, ethyl propionate and propyl propionate.

3. The lithium-ion secondary battery according to claim 1, wherein the lithium salt is at least one selected from LiPF$_6$, LiBF$_4$, LiBOB, LIDFOB, LiAsF$_6$, Li(CF$_3$SO$_2$)$_2$N, Li(FSO$_2$)$_2$N, LiPO$_2$F$_2$, LiCF$_3$SO$_3$ and LiClO$_4$.

4. The lithium-ion secondary battery according to claim 1, wherein an anode active material used therein is at least one selected from natural graphite, artificial graphite, soft carbon, hard carbon, lithium titanate, silicon, silicon-carbon alloy and silicon-oxygen alloy.

5. An energy storage device, comprising the lithium-ion secondary battery according to claim 1.

6. An energy storage device, comprising the lithium-ion secondary battery according to claim 2.

7. An energy storage device, comprising the lithium-ion secondary battery according to claim 3.

8. An energy storage device, comprising the lithium-ion secondary battery according to claim 4.

* * * * *